US009188152B1

United States Patent
Kacines

(10) Patent No.: US 9,188,152 B1
(45) Date of Patent: Nov. 17, 2015

(54) SELF-ADJUSTING STOCKING HANGER

(71) Applicant: Jeffery J. Kacines, Allen, TX (US)

(72) Inventor: Jeffery J. Kacines, Allen, TX (US)

(*) Notice: Subject to any disclaimer, the term of this patent is extended or adjusted under 35 U.S.C. 154(b) by 0 days.

(21) Appl. No.: 14/259,351

(22) Filed: Apr. 23, 2014

Related U.S. Application Data

(63) Continuation of application No. 13/294,330, filed on Nov. 11, 2011, now abandoned.

(60) Provisional application No. 61/456,802, filed on Nov. 12, 2010.

(51) Int. Cl.
| A47G 33/00 | (2006.01) |
| F16B 45/00 | (2006.01) |
| A47G 25/00 | (2006.01) |
| A47G 33/10 | (2006.01) |

(52) U.S. Cl.
CPC ............... *F16B 45/00* (2013.01); *A47G 25/00* (2013.01); *A47G 33/10* (2013.01)

(58) Field of Classification Search
CPC ....... A47G 33/10; A47G 25/00; A47G 33/00; F16B 45/00
USPC ............. 248/300–306, 214–215, 339, 205.1, 248/690, 914, 915; D8/367, 370
See application file for complete search history.

(56) References Cited

U.S. PATENT DOCUMENTS

| 2,413,772 | A | * | 1/1947 | Morehouse | 24/457 |
| 2,536,407 | A | * | 1/1951 | Wolfe | A47G 33/04 248/215 |
| 4,418,496 | A | * | 12/1983 | Koistinen | A01G 5/04 248/215 |
| 4,887,785 | A | | 12/1989 | Blaich | |
| 5,575,446 | A | | 11/1996 | Swenson | |
| 5,642,819 | A | | 7/1997 | Ronia | |
| D398,516 | S | | 9/1998 | Brown | |
| 6,155,526 | A | | 12/2000 | Brown | |
| D447,936 | S | * | 9/2001 | Kacines | D8/394 |
| 6,378,827 | B1 | | 4/2002 | Kacines | |
| 6,848,660 | B2 | | 2/2005 | Jackson | |
| D546,170 | S | | 7/2007 | Adams | |
| 7,661,639 | B2 | | 2/2010 | Jackson | |
| 7,988,116 | B2 | * | 8/2011 | Kacines | A47G 33/04 248/915 |
| 8,104,734 | B2 | | 1/2012 | Stover | |
| D654,706 | S | | 2/2012 | Kacines | |
| 2007/0131832 | A1 | * | 6/2007 | Adams | 248/227.4 |

* cited by examiner

*Primary Examiner* — Tan Le
(74) *Attorney, Agent, or Firm* — Roger N. Chauza, PC

(57) ABSTRACT

An ornamental hanger having a scroll shape with an upper open loop that is sufficiently large to accommodate an edge of a mantle therein. The hanger includes a lower open loop from which an item can be hung so that the lower open loop can swing under the edge of the mantle and be located generally under the upper open loop. The upper open loop terminates in a partial loop having a bottom curved surface for resting on the mantle. The lower curved portion of the partial loop is covered with a non-slip material to prevent movement of the hanger on the mantel surface.

19 Claims, 2 Drawing Sheets

SELF-ADJUSTING STOCKING HANGER

RELATED APPLICATION

This is a continuation patent application of pending non-provisional patent application Ser. No. 13/294,330 filed Nov. 11, 2011, which claims the benefit of U.S. provisional patent application No. 61/456,802, filed Nov. 12, 2010.

TECHNICAL FIELD OF THE INVENTION

The present invention relates in general to ornamental hangers, and more particularly to hangers for hanging items from mantles and the like.

BACKGROUND OF THE INVENTION

Ornamental hangers are frequently used to hang or suspend items therefrom for displaying the same. The items are often ornamental to express special holiday atmospheres around the home and office. For example, during the Christmas holiday, stockings, Christmas tree ornaments and other items are often hung from mantles, window sills, and the like. Thanksgiving holiday ornaments are often displayed in houses to express the atmosphere of the holiday.

Ornamental hangers can be of many designs, and may often themselves be ornamental. As noted above, it is a common practice to hang ornaments such as Christmas stockings, and the like, on a mantle or ledge to display the same. Rather than using a nail or other hanger that is permanent, temporary ornament hangers are used so that they can be placed on the mantle, shelf or ledge to hang the items therefrom, and thereafter remove the hanger without marring or leaving a hole in the woodwork. Temporary ornament hangers are disclosed in U.S. Pat. No. 5,642,819 by Ronia; U.S. Pat. No. 6,378,827 by Kacines; U.S. Pat. No. 7,988,116 by Kacines; pending design application serial no. 29/370,683, filed Aug. 21, 2010 by Kacines; and D447,936 by Kacines. Other ornament hangers are available which include various types of metal, glass and resin figurines attached to respective hook-like devices.

Many ornamental hangers are constructed and otherwise shaped to accommodate a particular type of mantle or edge on which it rests. A common problem with many hangers is that when a weighty item is suspended therefrom, the hanger tends to be moved outwardly toward the edge of the mantle. This is because the position of the weighty item tends to move the hanger so that the item is positioned vertically under the point of contact of the part of the hanger that rests on the mantle. Often, the hanger rotates or adjusts until this position can be achieved, or more often, other parts of the hanger engage the edge of the mantle and prevent further rotation of the hanger. It is at this point that the hanger tends to slide toward the edge of the mantle.

The shape of the hanger can be made to accommodate the edge of the mantle, shelf or window edge, but the resulting utilitarian shapes would often not be decorative and thus not aesthetically pleasing.

From the foregoing, a need exists for an ornamental hanger that is self-adjusting with respect to the shape of the edge of the mantle on which it rests. Another need exists for an ornamental hanger that resists movement on a mantle while weighty or other items are suspended therefrom. Another need exists for an ornamental hanger that is itself ornamental, but yet includes a portion that extends outwardly away from the edge of the mantle to rotate according the shape or thickness of the mantle.

SUMMARY OF THE INVENTION

In accordance with the principles and concepts of the invention, there is disclosed an ornamental hanger that is scroll shaped to provide an aesthetically pleasing appearance when placed on a mantle or other structure. An upper open loop terminates in a partial loop that is about the same size as a lower open loop of the scroll-shaped hanger, thereby enhancing the scroll design appearance. An item can be hung from the lower open loop, and a bottom surface of the partial loop is covered with a non-slip material to prevent the hanger from sliding on the surface of the mantle.

In accordance with one feature of the invention, the upper open loop is of a sufficient diameter as to accommodate an edge of a mantle therein, so that the lower open loop and the item suspended therein can swing and be positioned under the upper open loop.

In accordance with another feature of the invention, the lower curved portion of the partial loop is sufficiently covered with a sleeve of non-slip material so that as the hanger rocks or rotates on the mantle top to achieve a stable position, at least a portion of the lower curved surface of the partial loop and the non-slip material engages the mantle top to prevent the hanger from sliding toward the edge of the mantle under the influence of the weight of the item.

In accordance with an embodiment of the invention, disclosed is a hanger for resting on a surface and hanging items from said hanger. The hanger includes an S-shaped scroll hanger having an upper open loop and a lower open loop. The upper open loop and the lower open loop are connected by a connecting part. The upper open loop has a radius that is at least as large as a radius of the lower open loop. A non-slip surface covers at least a part of a lower curved surface of the upper open loop, and the non-slip covering provides friction between the lower curved surface of the upper open loop and the surface on which the hanger rests.

With regard to yet another embodiment of the invention, disclosed is a hanger for resting on a surface and hanging items from said hanger. The hanger includes an S-shaped scroll hanger having an upper open loop and a lower open loop. The upper open loop and the lower open loop are connected by a connecting part. The upper open loop terminates in a partial loop that has a radius about the same as that of said lower open loop. The upper open loop has a diameter and shape to accommodate a ledge of a mantle therein so that the lower open loop is substantially under the partial loop. A non-slip transparent material covers at least a part of a lower curved surface of the partial loop, and the non-slip material provides friction between the lower curved surface of the partial loop and the surface on which the hanger rests.

According to another embodiment of the invention, disclosed is a method of constructing a hanger for resting on a surface and hanging items from said hanger. The method includes constructing an S-shaped scroll hanger having an upper open loop and a lower open loop, and connecting the upper open loop to the lower open loop by a connecting part. The method further includes constructing the upper open loop terminated in a partial loop that has a radius about the same as that of the lower open loop. The upper open loop is constructed having a diameter and shape to accommodate a ledge of a mantle therein so that the lower open loop is substantially under the partial loop. A non-slip transparent material is fastened to at least a part of a lower curved surface of the partial loop. The non-slip sleeve provides friction between the lower curved surface of the partial loop and the surface on which the hanger rests

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
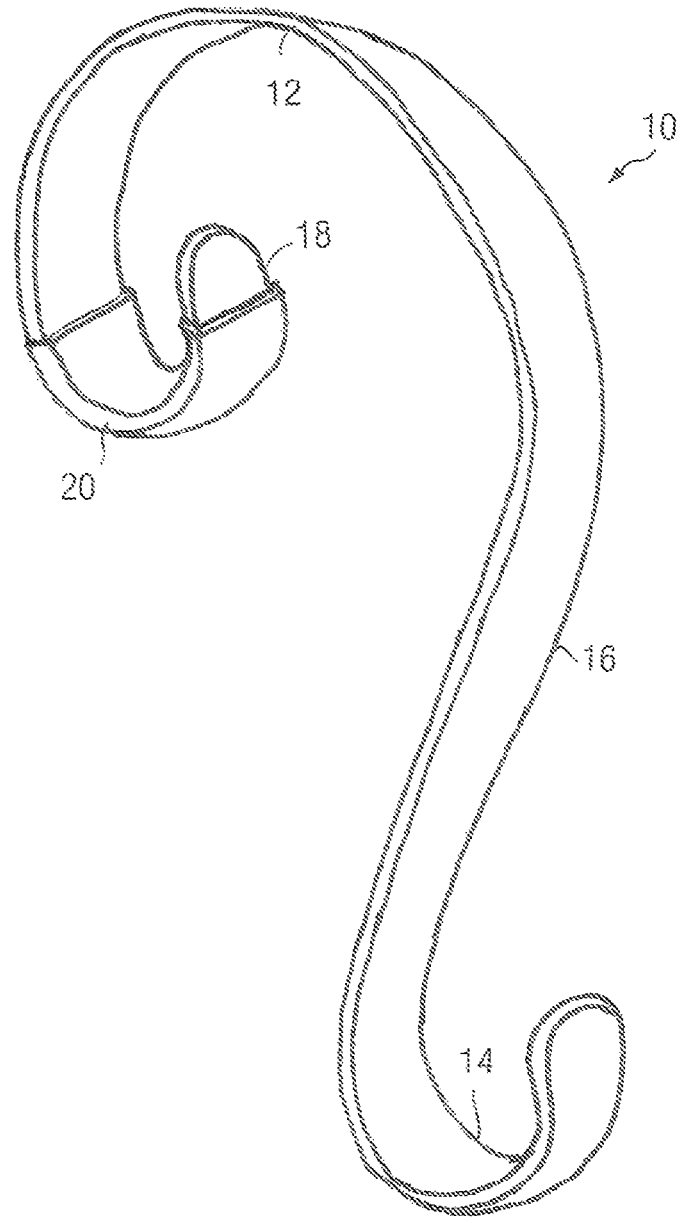
FIG. 1 is an isometric view of an ornamental hanger constructed according to one embodiment of the invention.

With reference to FIG. 1, there is shown an ornamental hanger 10 constructed according to one embodiment of the invention. In order to achieve the features of being aesthetically pleasing and rotatable or adjustable about mantles of different thicknesses, the hanger 10 is S-shaped, or scroll-shaped, with an upper large open loop 12 and a smaller lower open loop 14, connected by a gently curved connection part 16. The ornamental hanger 10 can be constructed of metal or other synthetic material that has a thickness such that it is generally not flexible. In other words, when a weighty item is suspended from the lower open loop 14, the body of the hanger does not flex substantially and change its general shape. In the preferred embodiment, the ornamental hanger 10 is constructed of metal having a thickness of about one sixteenth inch and a width of about one half inch. The cross-section of the hanger 10 is generally rectangular. The hanger 10 can be coated or pained to provide a finish that is contemporary. The hanger 10 can be constructed with different finishes to provide an array of different colors.

In accordance with the preferred embodiment, the ornamental hanger 10 is constructed with the upper large open loop 12 having a radius of about 1.625 inches, and with a smaller lower open loop 14 with a radius of about 0.625 inches. The total height of the ornamental hanger 10 is about 6.25 inches. The ratio of upper and lower radii is about 2.6, but can range from about 4.0 to about 1.75. This range allows the upper large open loop 12 to accommodate different thickness mantles but yet provide the general scroll shape that is aesthetically pleasing. The lower portion of the ornamental hanger 10 terminates in the lower open loop 14, and the upper portion 12 of the ornamental hanger 10 terminates in a partial loop 18 that has a radius the same or similar to that of the lower open loop 14. When the connection part 16 is oriented vertical, the lateral distance from the center of the partial loop 18 to the center of the lower open loop 14 is about 3.25 inches. This similarity in shape and size enhances the scroll shape and the aesthetically pleasing and balanced design. The lower open loop 14 is sufficiently open to place therein the strap or loop of the item to be suspended from the hanger 10. The lower curvature of the partial loop 18 provides a gently curved shape that does not mar or scratch the surface of the mantle on which the hanger 10 rests.

According to a feature of the ornamental hanger 10, the partial loop 18 of the upper open loop 12 can be covered with a sleeve 20 of a non-slip plastic material. The non-slip cover 20 can be constructed of many types of plastic material that provide a non-slip surface. The plastic material 20 can be somewhat soft to provide a non-slip characteristic. Moreover, the plastic sleeve 20 is transparent so that the color of the metal portion of the hanger 10 covered is easily seen therethrough. Stated another way, when the non-slip covering 20 is clear, it is not seen or observable by a person when placed on a mantle or the like. The non-slip sleeve 20 is of sufficient length so that when the hanger 10 rocks or rotates on the mantle, the non-slip sleeve 20 is always in contact with the surface of the mantle. The utilization of a closed sleeve 20 for the non-slip material prevents delamination or separation of the tubular covering 20 from the partial loop 18. Nonetheless, in the preferred embodiment, the non-slip material 20 is a length of a clear thick tape with adhesive on one side thereof. The length of the non-slip tape 20 is about 1.5 inches long and is adhered to the underside of the partial loop 18 so as to be non-movable. The utilization of a clear non-slip material prevents the possibility of visible skid marks should the ornamental hanger 10 slide on the mantle surface. A heat-shrinkable tubular or rubberized non-slip material can be used with equal effectiveness. Because the bottom width of the partial loop 18 is generally flat, and not circular as would be a rod, more surface area of the non-slip covering 20 is in contact with the surface of the mantle on which the hanger 10 rests.

Figure 2:
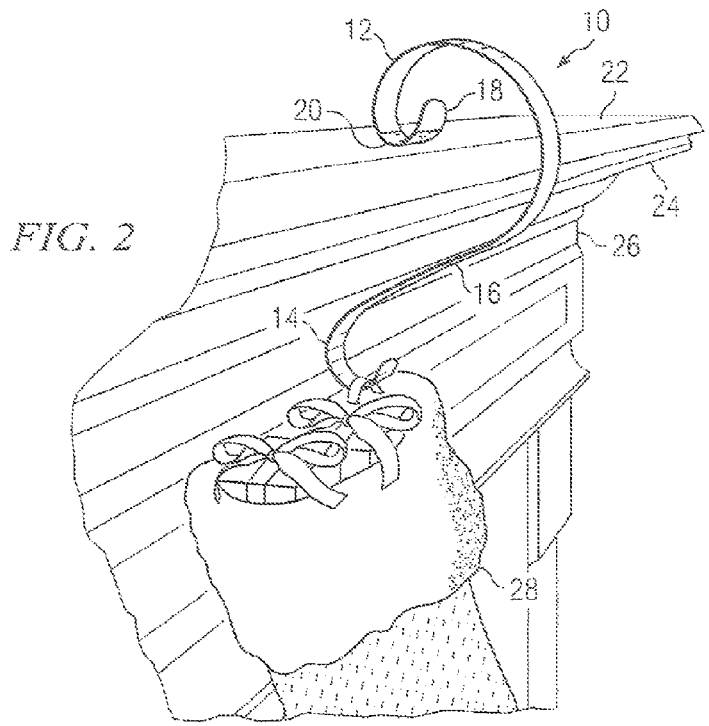
FIG. 2 is an isometric view of a position of the ornamental hanger of FIG. 1, when placed on a thin mantle.
Figure 3:
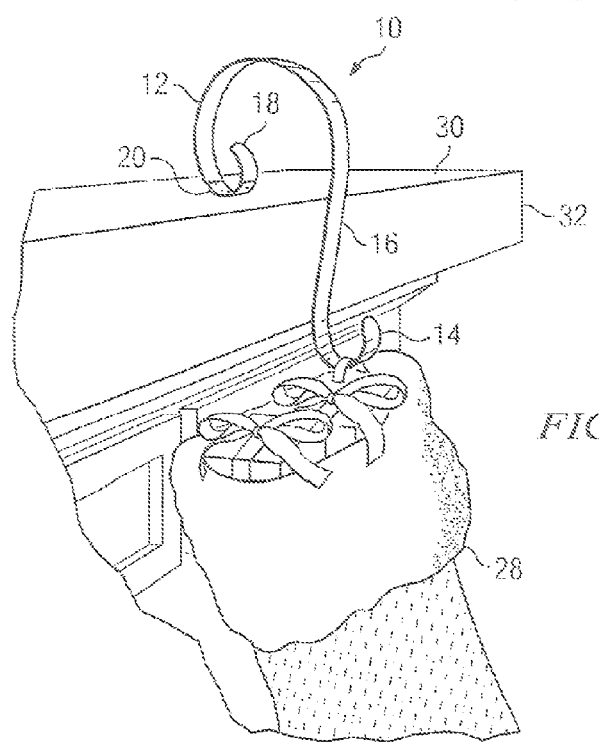
FIG. 3 is an isometric view of a position of the ornamental hanger of FIG. 1, when placed on a thick mantle.

FIGS. 2 and 3 illustrate the adaptability of the ornamental hanger 10 to accommodate mantels of different thicknesses. The ornamental hanger 10 of FIG. 2 is illustrated resting on a mantle 22 having a relatively thin thickness or overhang 24 so that the lower open loop 14 self-adjusts to a position generally suspended under the upper partial loop 18. In other words, the mantle 22 has a thickness or overhang 24 that allows the lower open loop 14 to swing inwardly in the recessed part 26 of the mantle 22 because of the weight of both the ornamental item 28 and the hanger 10 itself. In FIG. 2, the ornamental item 28 is a Christmas stocking, but could be any other item. It can be appreciated that as the lower open loop 14 of the hanger 10 swings to find its natural hanging position, as allowed by the shape or configuration of the mantle 22, the hanger 10 rocks about the undersurface of the upper partial loop 18. Since the curved undersurface of the upper partial loop 18 is covered with a non-slip material 20, any tendency of the hanger 10 to move or slide toward the outer edge of the mantle 22 is resisted by the friction between the non-slip material 20 and the surface of the mantle 22. The non-slip material 20 is of the type that provides a high degree of friction and resistance to movement on wood, plastic, metal, glass or other smooth surfaces. The non-slip material 20 can also be painted or coated on the bottom curved surface of the upper partial loop 18. The non-slip material 20 should cover a sufficient curved surface of the upper partial loop 18 so that when the hanger 10 self-adjusts to find a natural hanging position, the non-slip material 20 is always in contact with the surface on which it rests.

When the ornamental hanger 10 is placed on other types of mantles, such as the thick mantle 30 of FIG. 3, the lower open loop 14 may not be able to swing to a location under the upper open loop 12. If the top 32 of the mantle 30 is sufficiently thick, the connecting part 16 of the hanger 10 may engage the side of the mantle top 32, as shown, and be prevented from swinging to an otherwise natural position under the upper open loop 12. In this position, the connecting part 16 of the hanger 20 is in a more upright or vertical position, as compared to the position of the connecting part 16 of the hanger 10 shown in FIG. 2. It can be seen that as between the positions of the hanger 10 in FIGS. 2 and 3, the upper open loop 12 is rocked or rotated on the top horizontal surfaces of the mantels 22 and 30. Based on different configurations and shapes of mantels and other furniture or household furnishings, the ornamental hanger 10 can be rotated to other and more extreme positions. As such, the hanger 10 still appears as a pleasing scroll design, and the extended length of the non-slip material 20 on the undersurface of the upper open loop 12 prevents slipping of the hanger 10 on the mantle surface.

The ability of the ornamental hanger 10 to rotate and accommodate mantles of different configurations is attributed to the large upper loop 12 which accommodates the ledge 24 of thin mantle tops, as shown in FIG. 2, so as to be positioned therein. Stated another way, the large upper open loop 12 can extend over and around thin mantle tops or ledges so that the lower open loop 14 can be swung under or substantially under the upper open loop 12. With thick mantle tops 30, the radius of the upper open loop 12 is generally inconsequential, but nevertheless allows the connecting part 16 to engage the side or other edge of the mantle and allow items 28 to be suspended in the lower open loop 14. In any position to which the ornamental hanger 10 is rotated, the lower open loop 14 is oriented with the opening upright so that an item can be easily hung therein and will not inadvertently fall out.

The preferred embodiment of the invention has been described in connection with a mantle. However, it can be appreciated that the hanger 10 can be employed on many other structures to suspend an item therefrom to display the same.

While the preferred and other embodiments of the invention have been disclosed with reference to specific ornamental hangers, and associated methods of fabrication thereof, it is to be understood that many changes in detail may be made as a matter of engineering choices without departing from the spirit and scope of the invention, as defined by the appended claims.

What is claimed is:

1. A scroll-shaped hanger for resting on a mantle surface and for hanging an item from said scroll hanger, said item being of the type that is hung from mantles during a Christmas holiday, said scroll hanger comprising:
   an S-shaped scroll hanger having an upper open scroll loop and a lower open loop, said upper open scroll loop and said lower open loop connected by a linear elongated connecting part, said scroll hanger constructed of a material so that said scroll hanger is generally not flexible or resilient and does not change shape during use thereof when engaged with the mantle surface;
   said upper open scroll loop having a radius that is at least as large as a radius of said lower open loop, and said upper open scroll loop having an end that terminates in a partial loop that has a bottom shaped as an upwardly concave rocking surface that engages with a top of the mantle surface on which said scroll hanger rests, the bottom concave rocking surface having a sufficient area for resting said upper open scroll loop in a stable manner on the mantle surface so that said upper open scroll loop remains upright on the mantle surface when the item is suspended from said lower open loop;
   said connecting part allowing said scroll hanger to extend outwardly away from the edge of the mantle and rotate under a force of gravity according to the shape or thickness of the mantle; and
   said linear elongated connecting part separating said upper open scroll loop from said lower open loop is of sufficient length so that when said scroll hanger is lowered downwardly to engage the concave rocking surface with the mantle surface, the concave rocking surface of said partial loop allows the lower open loop to rock back and forth and self adjust to a position generally suspended under the concave rocking surface of said upper open scroll loop.

2. The scroll hanger of claim 1, further including in combination a Christmas stocking filled with gifts which defines the item.

3. The scroll hanger of claim 2, wherein said upper open loop is arranged with respect to said lower open loop for use with a first type mantle and a second type mantle, where the second type mantle has a thickness greater than the first type mantle, and said second type mantle has a side surface located between the top surface and a bottom surface thereof, said scroll hanger constructed for allowing said rocking surface to engage with a top surface of the first type mantle so that said lower open loop swings by gravity substantially under said upper open loop, and said scroll hanger constructed for allowing said rocking surface to engage with the top surface of the second type mantle so that a portion of said scroll hanger engages with the side surface of said second type mantle and the lower open loop does not swing under said upper open loop, and said scroll hanger does not bend or flex when used with either type of mantle.

4. The scroll hanger of claim 1, further including a non-slip material covering at least a bottom of said concave rocking surface of said upper open scroll loop.

5. The scroll hanger of claim 4, wherein said non-slip material comprises a sleeve that covers a curved portion of said upwardly concave rocking surface.

6. The scroll hanger of claim 1, wherein a cross-sectional shape of said partial loop is rectangular.

7. The scroll hanger of claim 5, wherein said non-slip material is transparent so that a finish or color of said partial loop is observable through said transparent non-slip covering.

8. The scroll hanger of claim 4, wherein said non-slip material is transparent so as not to be readily apparent.

9. The scroll hanger of claim 1, wherein said upper open scroll loop is shaped to accommodate a ledge of a mantle therein so that said lower open loop is substantially under said upper open scroll loop.

10. A scroll-shaped hanger for resting on a surface and for hanging a Christmas stocking filled with gifts from said scroll-shaped hanger, said hanger comprising:
   an S-shaped scroll hanger having an upper open loop and a lower open loop, said upper open loop and said lower open loop connected by a connecting part, said scroll hanger constructed of a material so that said scroll hanger is generally not flexible, said scroll hanger constructed so that when the Christmas stocking filled with gifts is suspended from said lower open loop, the upper open loop of said scroll hanger does not deform;
   said upper open loop terminating in a partial loop that has a radius about the same as that of said lower open loop and said upper open loop having an upwardly curved portion that is cross-sectionally shaped so that said upper open loop rests in a stable manner on a top surface on which said scroll hanger rests, said upwardly curved portion allowing said upper open loop to rock back and forth on the surface;
   said upwardly curved portion of said upper open loop allowing the lower open loop to rock back and forth under the surface and self adjust to a position generally suspended under the upwardly curved portion of said partial loop;
   a non-slip sleeve egg covering at least a part of the upwardly curved portion of said partial loop, said non-slip sleeve providing friction between said upwardly curved portion of said partial loop and the surface on which said scroll hanger rests; and
   said upper open loop having a diameter and shape to accommodate a ledge of a mantle therein so that said lower open loop is suspended substantially under said partial loop, and said upper open loop shaped to extend upwardly away from the surface on which said scroll hanger rests, and extends outwardly beyond an edge of the surface and then downwardly, said scroll hanger can rock back and forth without any engagement of the scroll hanger with the surface except engagement between the surface and the non-slip sleeve covering a lower surface of said upwardly curved portion.

11. The scroll hanger of claim 10, wherein said upper open loop has a radius at least twice that of a radius of said lower open loop.

12. The scroll hanger of claim 10, wherein a radius of said partial loop is substantially the same as a radius of said lower open loop.

13. The scroll hanger of claim 10, wherein a cross-sectional shape of said upwardly curved portion of said partial loop is rectangular.

14. A method of constructing a hanger that is self adjusting with respect to a shape of an edge of a mantle on which said hanger rests, said method comprising:

constructing an S-shaped scroll hanger with a material so that said scroll hanger is generally not flexible and does not change shape during use;

forming said S-shaped scroll hanger with an upper open scroll loop terminating in a partial loop, forming said partial loop with an upwardly concave portion for rocking on a top surface of the mantle, and forming said partial loop so as to support said upper open scroll loop on the mantle surface in a free standing manner so that said upper open scroll loop remains upright on the surface when the item is suspended from said scroll hanger;

constructing said scroll hanger with a lower open loop, and connecting said upper open scroll loop to said lower open loop by using a connecting part, said connecting part allowing a lower portion of the scroll hanger to extend outwardly away from the edge of the mantle and rotate according to the shape or thickness of the mantle; and forming said upper open scroll loop with a diameter and shape to extend around the edge of the mantle so that for thin mantles said lower open loop rocks to a position that is substantially under said partial loop.

15. The method of claim 14, further including constructing said scroll hanger with a uniform cross-sectional shape throughout said hanger.

16. The method of claim 14, further including using a sleeve of non-slip material and sliding the sleeve of non-slip material over the upwardly concave portion.

17. The method of claim 14, further including forming said lower open loop with an upwardly concave shape.

18. The method of claim 14, further including forming said scroll hanger so that for mantles having a first thickness the lower open loop is substantially under said partial loop, and for mantles having a second thickness that is thicker than said first thickness, said connecting part engages an edge of said second thickness mantle and prevents said scroll hanger from rocking to a position where said lower open loop is under said partial loop.

19. The method of claim 14, further including forming said connecting part as an elongated linear member, said connecting member being linear when said scroll hanger is not in use.

* * * * *